United States Patent
Simionescu et al.

(10) Patent No.: US 9,965,397 B2
(45) Date of Patent: May 8, 2018

(54) FAST READ IN WRITE-BACK CACHED MEMORY

(71) Applicant: Avago Technologies General IP (Singapore) Pte. Ltd, Singapore (SG)

(72) Inventors: Horia Simionescu, Foster City, CA (US); Siddartha Kumar Panda, Bangalore (IN); Kunal Sablok, Bangalore (IN); Veera Kumar Reddy Oleti, Bangalore (IN)

(73) Assignee: AVAGO TECHNOLOGIES GENERAL IP (SINGAPORE) PTE. LTD., Singapore (SG)

(*) Notice: Subject to any disclaimer, the term of this patent is extended or adjusted under 35 U.S.C. 154(b) by 201 days.

(21) Appl. No.: 13/833,127

(22) Filed: Mar. 15, 2013

(65) Prior Publication Data
US 2014/0244902 A1 Aug. 28, 2014

Related U.S. Application Data

(60) Provisional application No. 61/769,361, filed on Feb. 26, 2013.

(51) Int. Cl.
| G06F 12/08 | (2016.01) |
| G06F 12/0893 | (2016.01) |
| G06F 12/0888 | (2016.01) |
| G06F 12/0815 | (2016.01) |
| G06F 12/0802 | (2016.01) |
| G06F 12/0804 | (2016.01) |

(52) U.S. Cl.
CPC ...... *G06F 12/0893* (2013.01); *G06F 12/0802* (2013.01); *G06F 12/0804* (2013.01); *G06F 12/0815* (2013.01); *G06F 12/0888* (2013.01)

(58) Field of Classification Search
CPC ............ G06F 12/0893; G06F 12/0804; G06F 12/0802; G06F 12/0815; G06F 12/0888
See application file for complete search history.

(56) References Cited

U.S. PATENT DOCUMENTS

| 5,778,430 | A | 7/1998 | Ish et al. ................ 711/133 |
| 6,460,122 | B1 | 10/2002 | Otterness et al. .......... 711/154 |
| 6,564,285 | B1* | 5/2003 | Mills et al. ............. 711/103 |
| 7,177,983 | B2 | 2/2007 | Royer ................. 711/133 |
| 7,356,651 | B2 | 4/2008 | Liu et al. .............. 711/144 |
| 7,640,395 | B2 | 12/2009 | Coulson et al. .......... 711/113 |
| 8,959,292 | B1* | 2/2015 | Ahn ................. G06F 3/067 711/154 |
| 2005/0038963 | A1* | 2/2005 | Royer ............... G06F 12/126 711/133 |
| 2008/0104329 | A1* | 5/2008 | Gaither et al. .......... 711/138 |
| 2014/0143493 | A1* | 5/2014 | Loh et al. ............. 711/122 |

* cited by examiner

*Primary Examiner* — Arpan P. Savla
(74) *Attorney, Agent, or Firm* — Sheridan Ross P.C.

(57) ABSTRACT

An apparatus having a cache and a circuit is disclosed. The cache includes a plurality of cache lines. The cache is configured to (i) store a plurality of data items in the cache lines and (ii) generate a map that indicates a dirty state or a clean state of each of the cache lines. The cache also has a write-back policy to a memory. The circuit is configured to (i) check a location in the map corresponding to a read address of a read request and (ii) obtain read data directly from the memory by bypassing the cache in response to the location having the clean state.

20 Claims, 4 Drawing Sheets

FAST READ IN WRITE-BACK CACHED MEMORY

FIELD OF THE INVENTION

The invention relates to caches generally and, more particularly, to a method and/or apparatus for implementing a fast read in a write-back cached memory.

BACKGROUND

Conventional cached storage volumes operating in a write-back mode check the cache for requested read data in response to each read request. If the cache is small compared with the storage volume, most read requests result in cache misses. Therefore, most read requests experience a latency in checking the cache and ultimately obtain the requested data from the storage volume due to the high percentage of cache misses. Little benefit is commonly gained by checking the cache in designs having less than a 1-2% cache-to-storage ratio.

SUMMARY

The invention concerns an apparatus having a cache and a circuit. The cache includes a plurality of cache lines. The cache is configured to (i) store a plurality of data items in the cache lines and (ii) generate a map that indicates a dirty state or a clean state of each of the cache lines. The cache also has a write-back policy to a memory. The circuit is configured to (i) check a location in the map corresponding to a read address of a read request and (ii) obtain read data directly from the memory by bypassing the cache in response to the location having the clean state.

BRIEF DESCRIPTION OF THE FIGURES

Embodiments of the invention will be apparent from the following detailed description and the appended claims and drawings in which:

DETAILED DESCRIPTION OF THE PREFERRED EMBODIMENTS

Embodiments of the invention include providing a fast read in a write-back cached memory that may (i) accelerate read requests, (ii) bypass the cache based on information in a bitmap of the cache, (iii) service the read request from the cache based on the information in the bitmap, (iv) read directly from the memory volume under most conditions, (v) improve an input/output transfer per second performance, (vi) improve a read latency performance and/or (vii) be implemented in one or more integrated circuits.

Some embodiments introduce a mechanism at a front end of read input/output (e.g., I/O) processing that enables a fast-path execution for a majority of read requests. The fast-path execution provides a performance improvement, both in terms of input output transfers per second and read latency in a write-back cached environment. For write I/Os (or requests) to a memory volume (or drive) configured with the write-back caching policy, the cache helps reduce a write latency as seen by host circuits because the write requests are serviced from the cache. Where a ratio of a cache size to a memory volume size is small, most read requests result in cache misses. In designs incorporating fast back end disk-like Flash memory, bypassing the cache eliminates the latency of determining a cache hit or cache miss for a majority of read requests.

Figure 1:
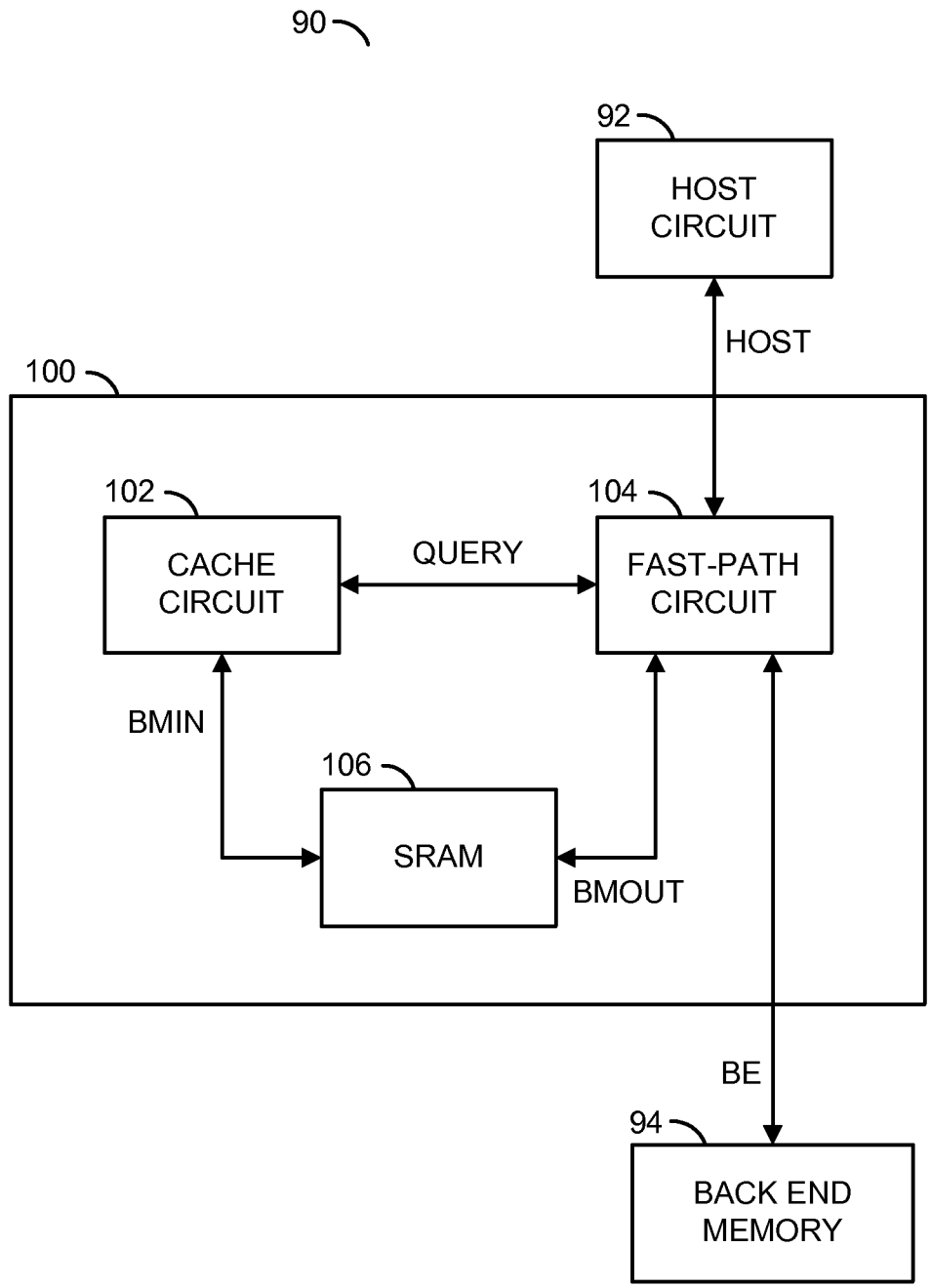
FIG. 1 is a block diagram of a system.

Referring to FIG. 1, a block diagram of a system 90 is shown. The system (or circuit or apparatus) 90 generally comprises one or more blocks (or circuits) 92 (one shown for simplicity), a block (or circuit) 94 and a block (or circuit) 100. The circuit (or device or apparatus) 100 generally comprises a block (or circuit) 102, a block (or circuit) 104 and a block (or circuit) 106. The circuits 92 to 106 may represent modules and/or blocks that may be implemented as hardware, software, a combination of hardware and software, or other implementations.

A bidirectional signal (e.g., HOST) is shown between the circuit 92 and the circuits 102 and 104. The signal HOST carries host-related commands and data. The host-related commands and data include, but are not limited to, read requests (or commands), write requests (or commands), read data and write data between the circuits 92 and 100. A bidirectional signal (e.g., BE) is shown between the circuit 104 and the circuit 94. The signal BE carries back end commands and data. The back end-related commands and data include, but are not limited to, read requests, write requests, read data and write data being written to and/or read from the circuit 94. A signal (e.g., REQUEST) is shown from the circuit 104 and the circuit 102. The signal REQUEST carries cache-related commands and data from the circuit 104 to the circuit 102. The cache-related commands and data include, but are not limited to, read addresses, write addresses, read data and write data. A bidirectional signal (e.g., BM) is shown between the circuit 102 and the circuit 106. The signal BM conveys address information, read/write commands and bitmap information written into and read from the circuit 106 by the circuit 102. A bidirectional signal (e.g., QUERY) is shown exchanged between the circuit 104 and the circuit 106. The signal QUERY carries address read information, read commands and the bitmap information stored in the circuit 106.

The circuit 92 is shown implemented as one or more host circuits (or computers). The circuit 92 is operational to write data to the circuit 94 via the circuit 100. The circuit 92 is also operational to read data from the circuit 94 via the circuit 100.

The circuit 94 is shown implemented as a back end memory circuit (or storage volume). The circuit 94 is operational to store the write data written by the circuit 92 via the circuit 100. The circuit 94 is also operational to provide the read data requested by the circuit 92 via the circuit 100. In some embodiments, the circuit 94 is implemented as a nonvolatile volume (or solid state drive) using nonvolatile (e.g., Flash) memory. Other memory technologies may be implemented to meet the criteria of a particular application.

The circuit 100 is shown implemented as a memory volume control circuit. The circuit 100 is operational to control writing to and reading from the circuit 94. The circuit 100 is also operational to cache write requests to improve the write latency. In some situations, the circuit 100 may bypass a search of the cache while servicing a read request and obtain the requested read data directly from the circuit 94. In other situations, the circuit 100 may check the cache for the request read data. If the requested read data is found in the cache, the circuit 100 returns the read data to the circuit 92 from the cache. If the requested read data is not found in the cache, the circuit 100 obtains the read data from the circuit 94 and returns the read data to the circuit 92. In some embodiments, the circuit 100 is fabricated as one or more integrated circuits (or chips or die).

The circuit 102 is shown implemented as a cache circuit. The circuit 102 is operational to cache read data and write data ahead of the circuit 94. The circuit 102 implements at least a write-back policy to the circuit 94 in one or more modes. The write-back policy involves storing new write data in the circuit 102 without immediately storing a copy of the new write data in the circuit 94. When the new write data is removed from the circuit 102, the new write data is moved into the circuit 94. The circuit 102 is also operational to generate a bitmap of multiple hash buckets defined in the cache space. The bitmap contains a clean/dirty indication for each hash bucket. If a hash bucket contains write data that has not been moved to the circuit 94, the associated location in the bitmap is marked as dirty. If all of the data in a hash bucket is also stored in the circuit 94, the associated location in the bitmap is marked as clean. In some embodiments, the circuit 102 is fabricated as one or more integrated circuits (or chips or die).

The circuit 104 is shown implemented as a fast-path circuit. The circuit 104 is operational to quickly route the read requests and the write requests generated by the circuit 92. For write requests, the circuit 104 directs the write to the circuit 102. For read requests, the circuit 104 determines if the requests should be routed to the circuit 102 for a cache search or directly to the circuit 94 to service the read I/O. The decision is based on the information stored in the bitmap created by the circuit 102. If the read requests are routed to the circuit 102 and the search result is a cache miss, the circuit 104 fetches the requested data from the circuit 94. If an existing bucket in the circuit 102 should be evicted from the circuit 102, the circuit 104 may transfer the evicted data to the circuit 94. In some embodiments, the circuit 104 is implemented using one or more processors. In some embodiments, the circuit 104 is fabricated as one or more integrated circuits (or chips or die).

The circuit 106 is shown implemented as a static random access memory (e.g., SRAM) circuit. The circuit 106 is operational to store the bitmap information (or data) generated by the circuit 102. In some embodiments, the circuit 106 may be a dual-port memory. A port is used by the circuit 102 to update the bitmap information as the status of the hash buckets change. Another port is used by the circuit 104 to read the bitmap information when processing read requests. In some embodiments, the circuit 106 is fabricated as one or more integrated circuits (or chips or die). Other memory technologies may be implemented to meet the criteria of a particular application.

Figure 2:
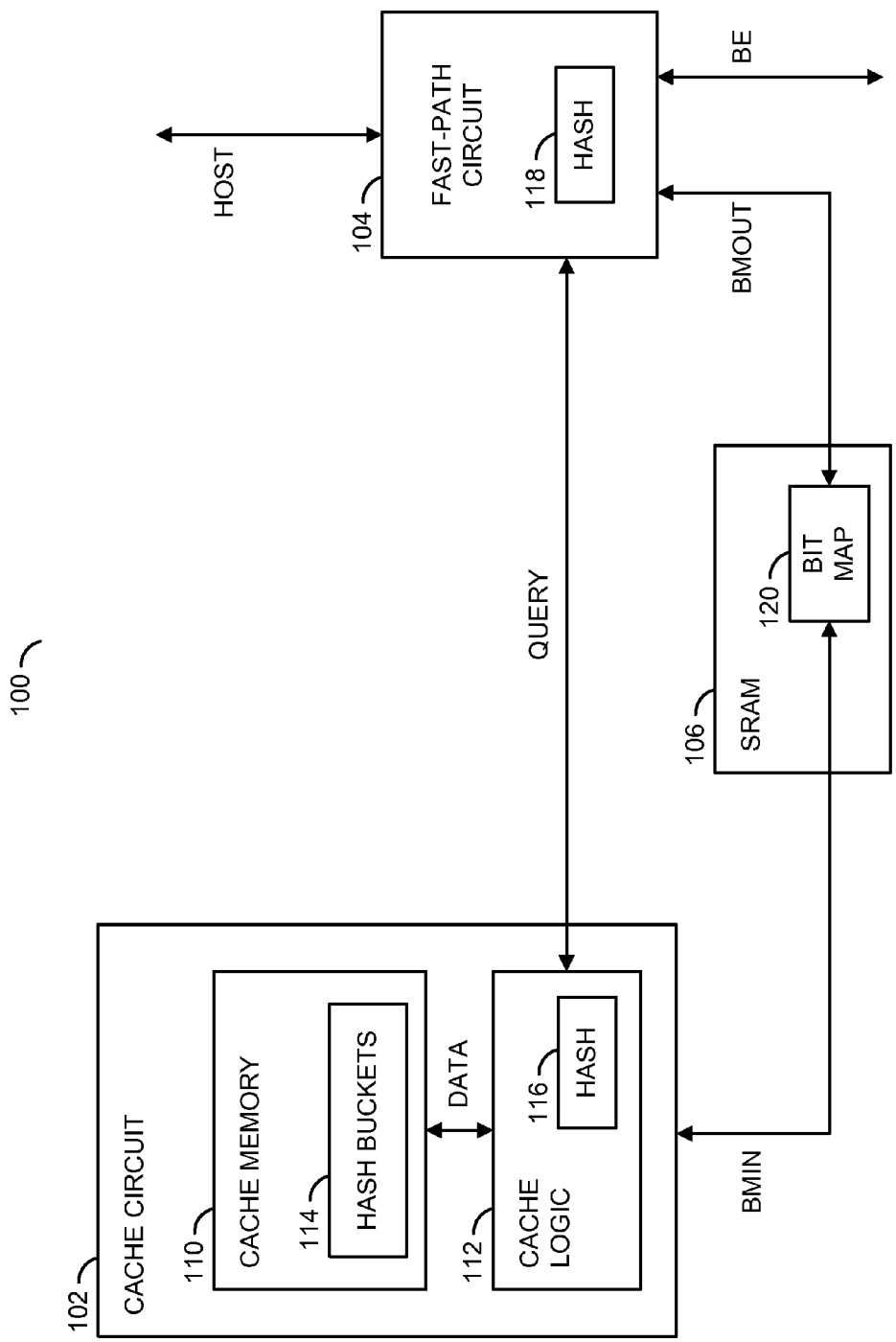
FIG. 2 is a block diagram of an example implementation of a control circuit in the system in accordance with an embodiment of the invention.

Referring to FIG. 2, a block diagram of an example implementation of the circuit 100 is shown in accordance with an embodiment of the invention. The circuit 102 generally comprises a block (or circuit) 110 and a block (or circuit) 112. The circuit 112 generally comprises multiple hash buckets 114 and a block (or circuit) 116. The circuit 104 generally comprises a block (or circuit) 118. The circuit 106 stores a bitmap 120. The circuits 110 to 118 may represent modules and/or blocks that may be implemented as hardware, software, a combination of hardware and software, or other implementations.

The circuit 110 is shown implemented as a cache memory. The circuit 110 is operational to store the cached data. A signal (e.g., DATA) is used to exchange the cache data between the circuit 110 and the circuit 112. The circuit 110 stores the cached data in multiple cache lines. Each cache line comprises one or more data items (or units of cached data). The selection among the cache lines is based on an address of the cached data stored in the cache line. In some situations where the cache lines can store multiple data items, such cache lines can buffer all clean data, all dirty data or a combination of clean and dirty data.

The circuit 112 is shown implemented as a cache controller. The circuit 112 is operational to control the storage of the cache data in the circuit 110. The circuit 112 also controls the hash buckets 114 to indicate the clean state or the dirty state of the corresponding cache lines. The circuit 112 implements at least the write-back policy to control the contents of the circuit 110. In some embodiments, approximately 32,000 the hash buckets 114 are defined for a 1 gigabyte (e.g., GB) circuit 110.

The circuit 116 is shown implemented as a hash function circuit. The circuit 116 is operational to generate hash values from the read addresses and the write addresses received in the signal REQUEST. The hash values are used by the circuit 112 to determine which of the hash buckets 114 relate to the addresses. The hash values are also used by the circuit 112 to maintain the corresponding clean/dirty information in the bitmap 120.

The circuit 118 is shown implemented as another hash function circuit. The circuit 118 is operational to generate additional hash values from the read addresses received in the signal HOST. The hash values are used by the circuit 104 to check specific locations in the bitmap 120 to decide if (i) the read requests should be sought in the circuit 102 or (ii) the contents of the circuit 102 should be ignored and the requested data read directly from the circuit 94. In some embodiments, the hash function implemented by the circuit 118 is the same as the hash function implemented by the circuit 116.

The bitmap 120 generally comprises multiple bits (or flags), one or more bits for each hash bucket 114. If a bit has the clean state (e.g., a logical zero or false state), the corresponding hash bucket 114 contains all clean data. If a bit has the dirty state (e.g., a logical one or true state), the corresponding hash bucket 114 contains one or more units (or items) of dirty data. In some embodiments, the bitmap 120 may consume approximately 4 kilobytes (e.g., KB) of the circuit 106 to store the information for approximately 32,000 hash buckets 114.

Figure 3:
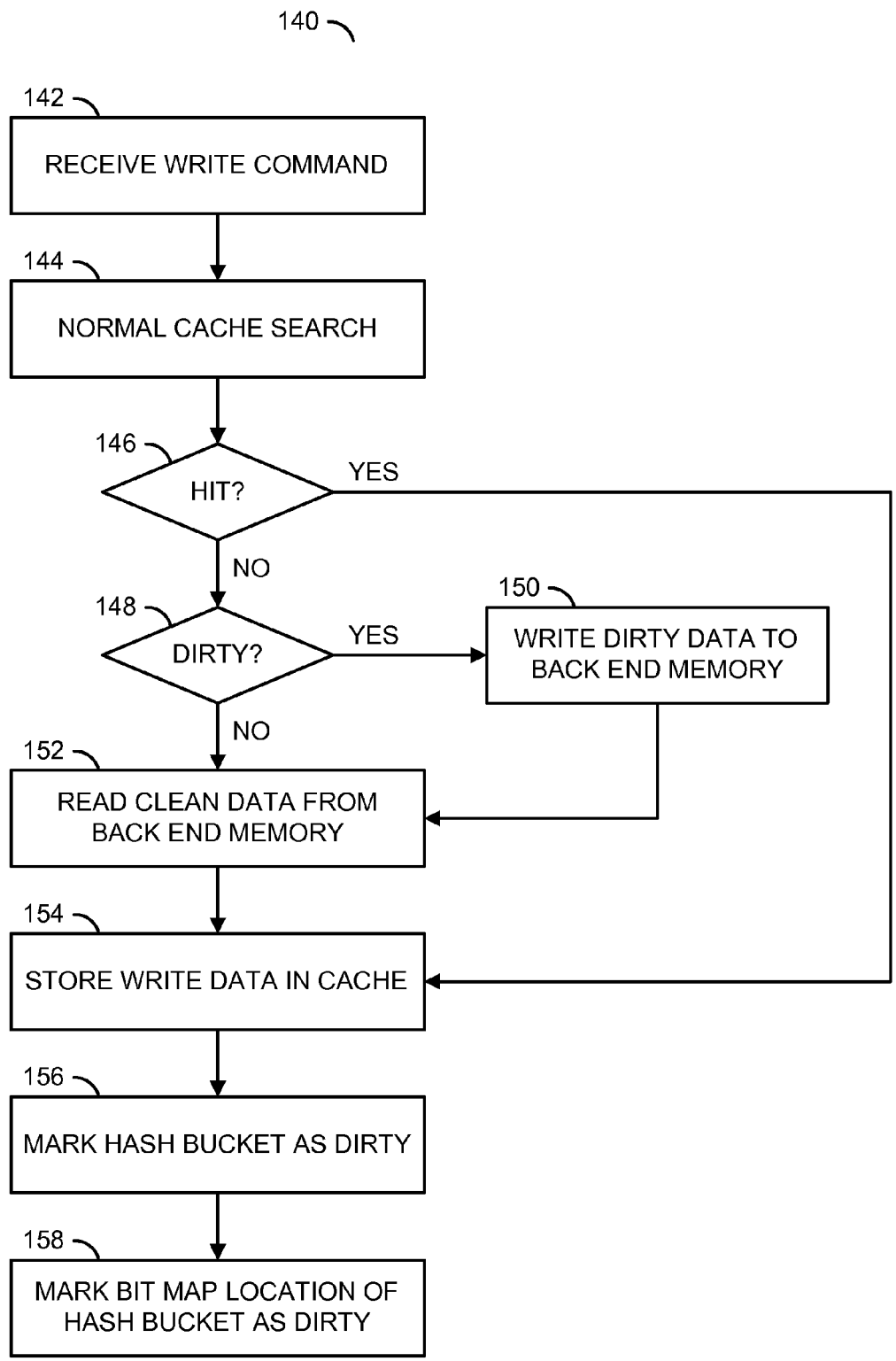
FIG. 3 is a flow diagram of an example method to service a write request.

Referring to FIG. 3, a flow diagram of an example method 140 to service a write request is shown. The method (or process) 140 is implemented by the circuit 100. The method 140 generally comprises a step (or state) 142, a step (or state) 144, a step (or state) 146, a step (or state) 147, a step (or state) 148, a step (or state) 150, a step (or state) 152, a step (or state) 154 and a step (or state) 156. The steps 142 to 156 may represent modules and/or blocks that may be implemented as hardware, software, a combination of hardware and software, or other implementations. The sequence of the steps 142 to 158 is shown as a representative example. Other step orders may be implemented to meet the criteria of a particular application.

In the step 142, the circuit 100 (the circuit 104) receives a write request from the circuit 92 in the signal HOST. The write request comprises a write address and write data. The circuit 104 passes the write request to the circuit 102 via the signal REQUEST. The circuit 102 performs a normal cache search in the step 144. If the search results in a cache hit, the method 140 continues with the step 154. If the search results in a cache miss per the step 146, the circuit 102 selects a cache line in which to store the write data in the step 147.

For a cache miss, a check of the selected cache line is made in the step 148 to determine if the cache line contains any dirty data. If no dirty data is found in the step 148, the method 140 continues with the step 154. If dirty data is found, the circuit 100 (e.g., the circuits 102 and 104) flushes the dirty data to the circuit 94 via the signal BE in the step 150. After flushing the dirty data, the circuit 112 marks the location in the bitmap 120 corresponding to the selected cache line/hash bucket 114 as clean if there is no other dirty data in the selected cache line in the step 152.

In the step 154, the circuit 112 stores the write data in the selected cache line. The circuit 116 generates a hash value from the write address and updates the corresponding location in the bitmap 120 with the dirty state through the signal BM in the step 156.

Figure 4:
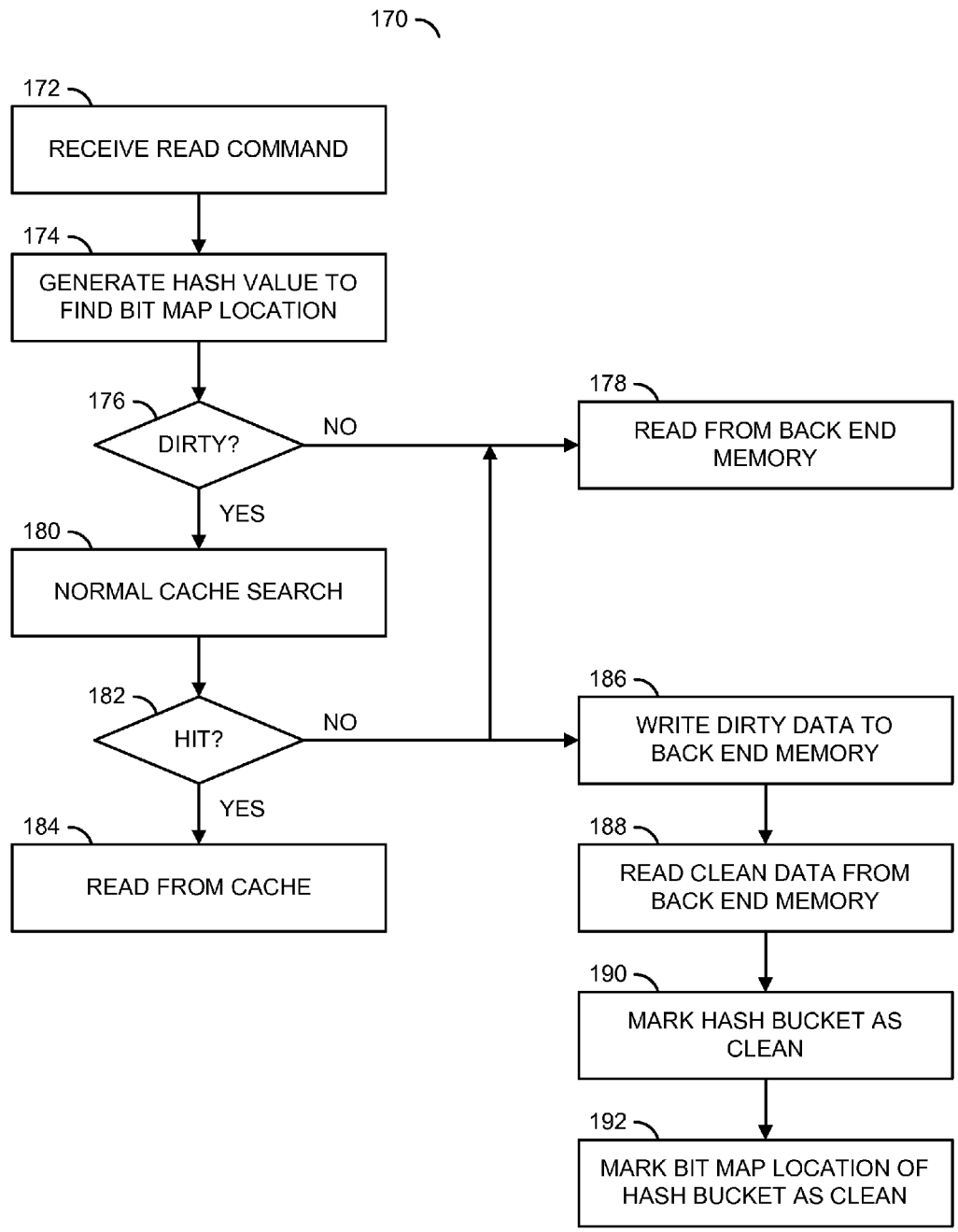
FIG. 4 is a flow diagram of an example implementation of a method to service a read request.

Referring to FIG. 4, a flow diagram of an example implementation of a method 170 to service a read request is shown. The method (or process) 170 is implemented by the circuit 100. The method 170 generally comprises a step (or state) 172, a step (or state) 174, a step (or state) 176, a step (or state) 178, a step (or state) 180, a step (or state) 182 and a step (or state) 184. The steps 172 to 184 may represent modules and/or blocks that may be implemented as hardware, software, a combination of hardware and software, or other implementations. The sequence of the steps 172 to 192 is shown as a representative example. Other step orders may be implemented to meet the criteria of a particular application.

In the step 172, the circuit 104 receives a read request from the circuit 92 via the signal HOST. The read request comprises a read address. The circuit 118 generates a hash value from the read address in the step 174. The hash value is used to determine a location in the bitmap 120 of a hash bucket 114 that corresponds to the read address. The clean/dirty state of the determined location is transferred from the circuit 106 via the signal QUERY to the circuit 104.

In the step 176, the circuit 104 decides if the determined location received from the bitmap 120 has the clean state or the dirty state. If the determined location has the clean state, the circuit 104 reads the requested read data from the circuit 94 in the step 178. If the determined location has the dirty state, the read request is passed to the circuit 102 for a normal cache search in the step 180. If the circuit 102 concludes a cache hit for the read address in the step 182, the requested data is read from the cache 102 in the step 184 and returned to the circuit 92. If the circuit 102 concludes a cache miss for the read address in the step 182, the requested read data is obtained from the circuit 94 in the step 178.

Bypassing the circuit 102 for most read accesses helps reduce the overhead for read operations, such as a region-lock taken for every read I/O. For example, the time spent for the region lock is avoided for most of the read I/Os where the corresponding location in the bitmap 120 is clean. Most of the read I/Os skip the cache logic of the circuit 112 and thus end up being serviced directly from the circuit 94. Therefore, the read latency caused by a cache search is eliminated in many cases. Avoiding the read latency helps the system 90 maintain a high I/O rate. The write-back caching behavior of the circuit 100 also helps reduce the write latency in lower I/O queue depths.

To avoid data integrity issues in cases where write-back dirty data is present in the cache, the quick check of the bitmap 120 enables the circuit 104 to determine when to seek the requested read data in the cache. The bitmap 120 is updated by the caching logic of the circuit 102 based on additions and removals of dirty data to and from the cache. Most of the cache search logic can also be implemented based on the hash buckets. Therefore, a bit per hash bucket 114 is stored in the bitmap 120 to indicate the presence of any dirty cache lines in the cache memory 110. The bitmap 120 is verified by the read I/O path of the circuit 104. Based on the bit value, the read can be serviced directly from the circuit 94 or through the cache logic. Where the cache size of the circuit 110 is considerably smaller than the storage size of the circuit 94 (e.g., 1%-2% of the circuit 94 capacity), most of the read I/Os are addressed with the circuit 104 bypassing the cache circuit 102.

The functions performed by the diagrams of FIGS. 1-4 may be implemented using one or more of a conventional general purpose processor, digital computer, microprocessor, microcontroller, RISC (reduced instruction set computer) processor, CISC (complex instruction set computer) processor, SIND (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a cache circuit comprising a cache memory and cache logic, the cache memory including a plurality of cache lines, and the cache logic configured to (i) store a plurality of data items in said cache lines and (ii) generate a map that indicates a dirty state or a clean state of each of said cache lines, wherein said cache has a write-back policy to another memory; and
a first circuit configured to (i) route a write request or a read request associated with the plurality of data items, (ii) check one or more bit values at a location in said map, the location corresponding to a read address of the read request and (iii) obtain read data directly from said another memory by bypassing said cache logic in response to said one or more bit values indicating that said location has said clean state,
wherein (i) said first circuit is further configured to generate a hash value by hashing said read address received from a host, and (ii) said one or more bit values checked at said location in said map is determined by said hash value.

2. The apparatus according to claim 1, wherein said cache first circuit is further configured to seek said read address in response to said one or more bit values indicating that said location has said dirty state.

3. The apparatus according to claim 2, wherein (i) said cache first circuit is further configured to obtain said read data from said cache memory in response to a cache hit and (ii) said first circuit is further configured to obtain said read data from said another memory in response to a cache miss.

4. The apparatus according to claim 1, wherein (i) said cache circuit is further configured to mark said location with said dirty state in response to storing write data in said cache memory and (ii) said write data (a) has a write address that is different than said read address and (b) is stored in one of said cache lines corresponding to said hash value.

5. The apparatus according to claim 4, wherein said cache circuit is further configured to mark said location with said clean state in response to evicting said write data from said cache memory.

6. The apparatus according to claim 1, wherein said cache logic is bypassed while (i) said read data sought by said read request is stored in said cache memory and (ii) said location corresponding to said read data has said clean state.

7. The apparatus according to claim 1, wherein said another memory comprises a Flash memory.

8. The apparatus according to claim 1, wherein said apparatus is implemented as one or more integrated circuits.

9. A method for fast read in a write-back cached memory, comprising the steps of:
routing a write request or a read request associated with a plurality of data items;
storing the plurality of data items in a plurality of cache lines of a cache memory in a cache circuit, wherein said cache circuit has a write-back policy to another memory;
generating a map that indicates a dirty state or a clean state of each of said cache lines;
checking one or more bit values at a location in said map corresponding to a read address of the read request;
obtaining read data directly from said another memory by bypassing a cache logic of the cache circuit in response to said one or more bit values indicating that said location has said clean state; and
generating a hash value by hashing said read address received from a host, wherein said one or more bits checked at said location in said map is determined by said hash value.

10. The method according to claim 9, further comprising the step of:
seeking said read address in said cache circuit in response to said one or more bits indicating said location has said dirty state.

11. The method according to claim 10, further comprising the steps of:
obtaining said read data from said cache memory in response to a cache hit; and
obtaining said read data from said another memory in response to a cache miss.

12. The method according to claim 9, further comprising the step of:
marking said location with said dirty state in response to storing write data in said cache memory, wherein said write data (i) has a write address that is different than said read address and (ii) is stored in one of said cache lines corresponding to said value.

13. The method according to claim 12, further comprising the step of:
marking said location with said clean state in response to evicting said write data from said cache memory.

14. The method according to claim 9, wherein said cache logic is bypassed while (i) said read data sought by said read request is stored in said cache memory and (ii) said location corresponding to said read data has said clean state.

15. The method according to claim 9, wherein the hash value is a first hash value, the method further comprising:
generating a second hash value by hashing a write address of the write request in said cache circuit.

16. An apparatus comprising:
a cache circuit including a cache memory and cache logic, the cache memory configured to store a plurality of data items in a plurality of cache lines, wherein said cache circuit has a write-back policy to another memory;

a bitmap module in communication with said cache circuit and configured to generate a map that implements a first bit to indicate a dirty state and a second bit to indicate a clean state of each of said cache lines;

one or more hash modules configured to check for either the first bit or the second bit at a location in said map corresponding to a read address of a read request; and a fast path module in communication with the one or more hash modules and the bitmap module, the fast path module configured to i) route the read request or a write request and ii) obtain read data directly from said another memory by bypassing said cache logic in response to said location having said second bit indicating said clean state, wherein the one or more hash modules generate a hash value by hashing said read address received from a host, and wherein said one or more bits checked at said location in said map is determined by said hash value.

17. The apparatus according to claim 1, further comprising:

a second circuit to store the plurality of data items in said cache lines as directed by the first circuit, wherein the second circuit comprises at least the cache logic, wherein the first circuit sends the read address to the second circuit, and wherein the second circuit generates another hash value by hashing the read address received from the first circuit to determine a hash bucket that relates to the read address and to maintain the map.

18. The apparatus according to claim 17, further comprising a third circuit, the third circuit comprising at least the map, wherein the first circuit is coupled to the second circuit and the third circuit, and wherein the first circuit is further configured to route the write request or the read request associated with the plurality of data items by using the second circuit to provide the read data for the read request only in response to said one or more bit values indicating that said location has said dirty state.

19. The apparatus according to claim 1, wherein the dirty state is a state in which the plurality of data items have not been moved from the cache memory to the another memory, and wherein the clean state is a state in which the plurality of data items have been moved from the cache memory to the another memory.

20. The apparatus according to claim 19, wherein the write-back policy is implemented by writing the plurality of data items to the cache memory, and delaying copying of the plurality of data items to the another memory until the plurality of data items are removed from the cache memory.

* * * * *